UNITED STATES PATENT OFFICE.

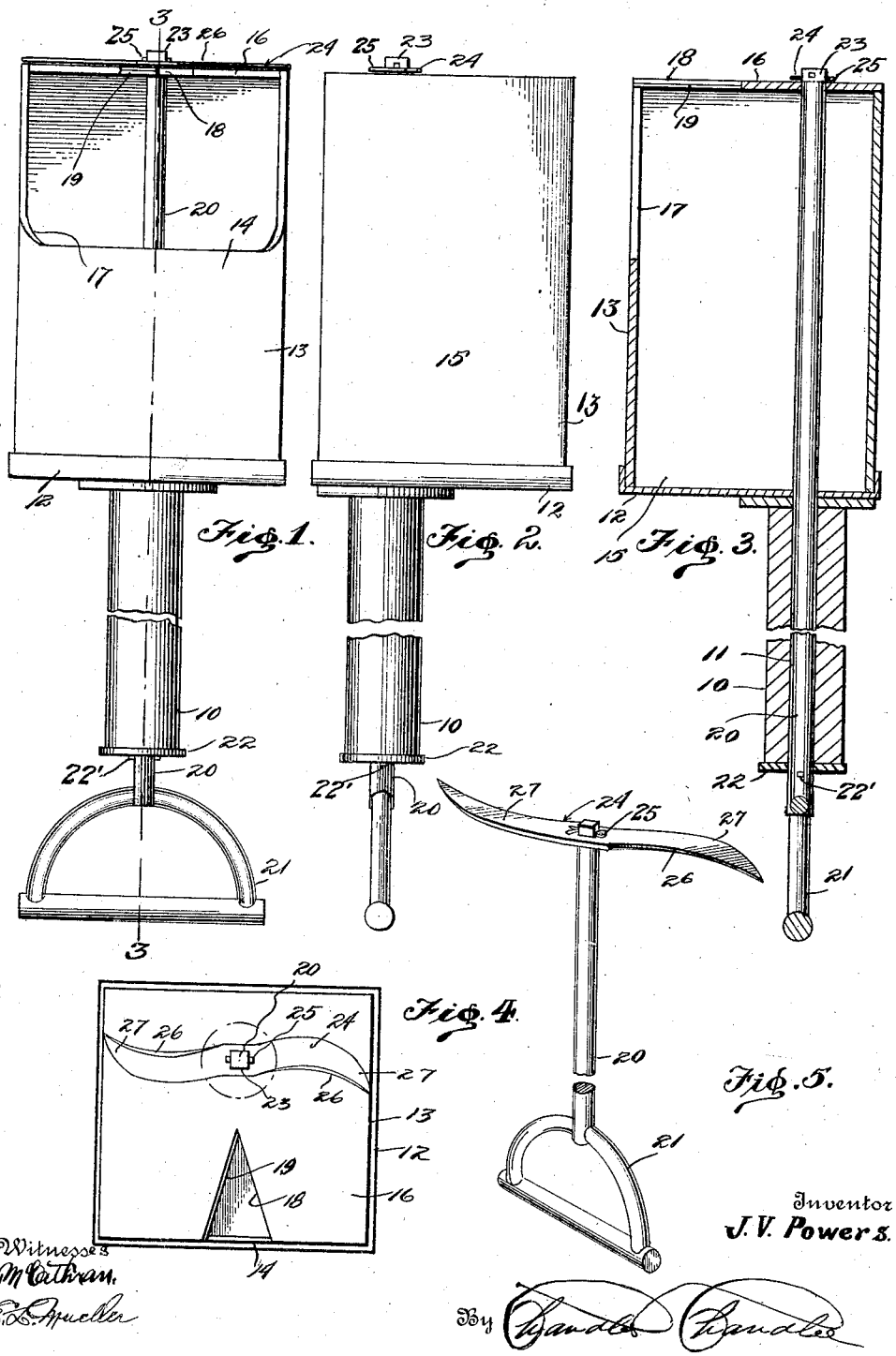

JOSEPH V. POWERS, OF MERRICK, NEW YORK.

FRUIT-PICKER.

1,307,417.　　　　　　　　Specification of Letters Patent.　　Patented June 24, 1919.

Application filed January 23, 1918.　Serial No. 213,358.

*To all whom it may concern:*

Be it known that I, JOSEPH V. POWERS, a citizen of the United States, residing at Merrick, L. I., in the county of Nassau, State of New York, have invented certain new and useful Improvements in Fruit-Pickers; and I do hereby declare the following to be a full, clear, and exact description of the invention, such as will enable others skilled in the art to which it appertains to make and use the same.

This invention is an improvement in fruit pickers and has particular reference to a device for cutting or severing the stems of fruit which are beyond the reach of persons standing on the ground.

An object of the invention is to provide a device wherein the fruit may be severed by a rotary cutter which has a portion of the receptacle for receiving the detached fruit coöperating therewith.

Another object is to provide a fruit picker of this character which is simple in construction, easy to manufacture and effective in carrying out the purpose for which it is designed.

The inventive idea involved is capable of receiving a variety of mechanical expressions one of which, for the purpose of illustrating the invention, is shown in the accompanying drawing, wherein:—

Figure 1 is a front elevation of the fruit picker constructed in accordance with the invention.

Fig. 2 is a side elevation thereof.

Fig. 3 is a vertical longitudinal section on the line 3—3 of Fig. 1.

Fig. 4 is a top plan view.

Fig. 5 is a detailed perspective view of the rotary cutter and the means for supporting and operating the same.

The invention is illustrated in the accompanying drawing, in what is now believed to be the preferred form and comprises a staff 10 having an opening 11 extending longitudinally therethrough and provided at its upper end with a supporting member 12 to which the staff is secured at a point adjacent the rear edge thereof.

The supporting member 12 may be of any formation and is herein shown as rectangular and this supporting member is adapted to receive the lower end of a receptacle or container 13 into which the fruit falls after being cut and which includes the front wall 14, side wall 15 and top 16. The front 14 is cut away to provide an opening 17 and the top 16 is provided with a slot or recess 18 extending inwardly from the front edge thereof, the edges of said slot converging inwardly with the inner ends thereof terminating at approximately the center of the top. The edge 19 of the slot or recess 18 is sharpened to provide a stationary cutting edge against which the stems of fruit are engaged, as will appear in the course of the description, so that the same will be severed and the fruit dropped into the receptacle.

The cutting mechanism preferably comprises a rod 20 extending longitudinally through the opening 11 in the staff 10 and provided at its lower end with a handle 21 having a flange 22 upon which the lower end of the staff is supported, said flange being held in place by a pin 22' extending through the rod beneath the same. The upper portion of the rod 20 extends through the bottom of the supporting member 12 and into tom of the receptacle 13 and through the top 16 of the receptacle 13 and its upper extremity is squared as indicated at 23 to receive thereon the cutter member 24 secured in position on the rod by means of the cotter pin 25 or other suitable fastener. This cutter preferably comprises oppositely directed cutting blades 26 having the outer ends curved as indicated at 27 and disposed in a plane parallel with the top 16 and arranged contiguous thereto so as to coöperate with the stationary edge 19.

In practice, the operator will adjust the receptacle 13 so as to receive the stems of the fruit 7 between the edges of the slot 18 with the fruit itself depending into the receptacle and then by rotating the handle 21 it will be apparent that a similar motion will be imparted to the cutter 24 through the medium of the rod 20 and said cutting blade 26 will then pass over the cutting edge 19 and coöperate therewith to sever the stem of the fruit and thus permit the same to fall into the receptacle or container.

What is claimed is:—

A fruit picker comprising a rigid receptacle having a fruit-receiving opening in the upper portion of its front wall and an inwardly tapered opening in its top communicating at its outer end with said front wall opening, an edge of the top wall opening being sharpened and constituting a cutting edge, a handle upon which the receptacle is supported, a shaft rotatable in the handle and depending therefrom and provided with a grip, said shaft extending through the receptacle and having bearings in its ends, and a cutter carried by the shaft in coöperative relation to the cutting edge of the top.

In testimony whereof I affix my signature in the presence of two witnesses.

JOSEPH V. POWERS.

Witnesses:
 ALICE PERRIN,
 MARGARET CRAIG.

Copies of this patent may be obtained for five cents each, by addressing the "Commissioner of Patents, Washington, D. C."